June 29, 1971 D. PARKER Re. 27,149

CARTRIDGE REPEATER PENCIL

Original Filed Aug. 18, 1966 2 Sheets-Sheet 1

INVENTOR.
DANIEL PARKER

BY

Fidler, Bradley & Patrick Attys.

CARTRIDGE REPEATER PENCIL

Original Filed Aug. 18, 1966 2 Sheets-Sheet 2

INVENTOR.
DANIEL PARKER
BY
Fidler, Bradley & Patrick Attys.

United States Patent Office

Re. 27,149
Reissued June 29, 1971

27,149
CARTRIDGE REPEATER PENCIL

Daniel Parker, Janesville, Wis., assignor to The Parker Pen Company, Janesville, Wis.

Original No. 3,437,413, dated Apr. 8, 1969, Ser. No. 573,240, Aug. 18, 1966. Application for reissue Apr. 3, 1970, Ser. No. 25,420
Int. Cl. B43k *21/16, 21/22*
U.S. Cl. 401—67 10 Claims

Matter enclosed in heavy brackets [ ] appears in the original patent but forms no part of this reissue specification; matter printed in italics indicates the additions made by reissue.

ABSTRACT OF THE DISCLOSURE

A writing instrument includes a throw-away pencil cartridge comprising a tubular barrel having an actuator assembly slidably mounted in its rearward portion and a self-contained pencil cartridge removably mounted in its forward portion. The self-contained cartridge includes a tubular shell for supporting a lead supply chamber and a lead advancing mechanism is operating engagement with the actuator assembly.

The present invention generally relates to mechanical pencils, and it relates more particularly to a mechanical pencil which includes a removable throw-away type of pencil cartridge incorporating a lead supply and feed mechanism.

Mechanical pencils of the step-by-step type have been known in the prior art for many years and although the cost of manufacturing the step-by-step lead advancing mechanism is substantially greater than the cost of manufacturing the screw feed type lead advancing mechanism, for many applications the ease of reliability of use far outweigh the added expense so that where quality is a prime consideration the step-by-step actuating mechanism is preferable.

Fountain pens, mechanical pencils, and some ball point pens, because of the high quality of design and the precision of manufacture, are treated in the nature of jewelry and under such circumstances the high quality of the craftsmanship and the materials which go into the making of the casing are extremely expensive. Since the average user of writing instruments has need for a fountain pen, a ball point pen, and a pencil from time to time, it would be desirable to provide a single housing in which all three of these different types of writing instruments are adapted to be replaceably mounted. Such a casing could thus accommodate a ball point pen cartridge, a mechanical pencil cartridge, and a fountain pen cartridge. The present invention is concerned with such a casing and with a replaceable type mechanical pencil cartridge which is adapted to be operatively mounted within such casing.

Another reason for designing a mechanical pencil cartridge which is compatible with a housing which also accommodates a ball point pen cartridge and/or a fountain pen cartridge is to reduce substantially the cost of manufacturing both instruments. The separate dies, molds, and other equipment required to manufacture the housings need not be duplicated since the same housing is usable for the several types of writing instruments. Moreover the dealer is not required to stock as many items on his shelf since the same housing can be filled with any one of the different types of cartridges at the time of purchase, thus appreciably reducing the dealer's required inventory.

Replaceable ball pen cartridges and, more recently, replaceable fountain pen cartridges have been enthusiastically received by the public because of the ease of use and reliability of operation. To date, there has not been a similar mechanical pencil type of writing instrument available on the market. It would, however, be desirable to provide such an instrument. Moreover, because of the mechanical nature of the feed mechanism of this type pencil, it would be desirable to replace the entire feed mechanism whenever a new supply of lead is placed in the instrument. The feed mechanism can be designed to operate efficiently for a full, predetermined supply of lead thereby permitting a sufficiently low manufacturing cost to permit the marketing of the throw-away type of cartridge at a reasonable price.

It is, therefore, a principal object of the present invention to provide a new and improved writing instrument.

Another object of the present invention is to provide a writing instrument in which the writing mechanism can be readily replaced with an entirely different type of mechanism.

Still another object of the present invention is to provide a new and improved type of mechanical pencil.

Another object of the present invention is to provide a new and improved mechanical pencil employing a step-by-step lead feeding mechanism.

A further object of the present invention is to provide a mechanical pencil incorporating a throw-away cartridge assembly.

A still further object of the invention is to provide a mechanical pencil having a replaceable, throw-away type of step-by-step lead feeding cartridge assembly.

Briefly, the above and further objects are realized in accordance with the present invention by providing a throw-away pencil cartridge which includes, as an integral part thereof, a step-by-step lead feed mechanism and a lead storage chamber permanently connected thereto. The cartridge includes an axially movable actuator member which fits into the actuating mechanism of a writing instrument shell which is also adapted to accommodate either a ball pen cartridge or a fountain pen cartridge.

Further objects and advantages and a better understanding of the present invention may be had by reference to the following detailed description of the invention taken in connection with the accompanying drawings, wherein.

Figure 1:
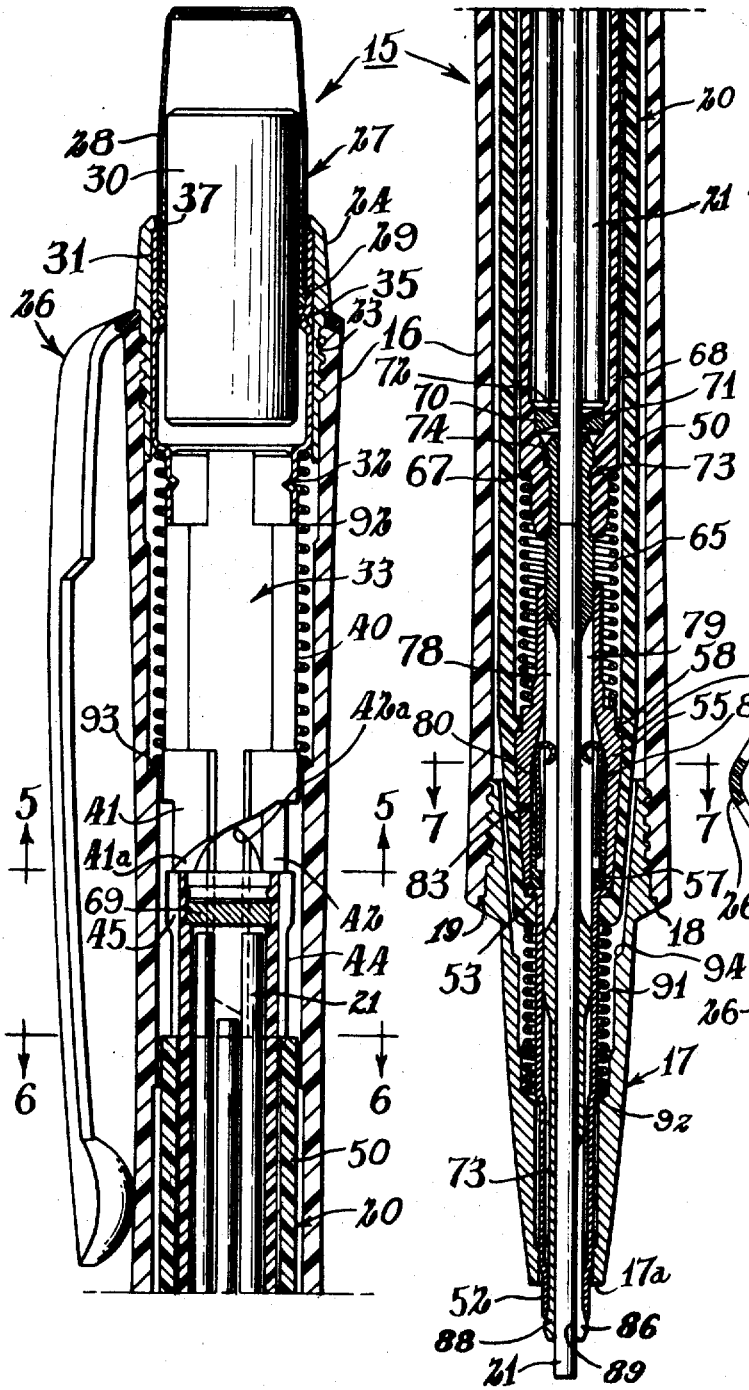
FIGURE 1 is a longitudinally sectioned view of a writing instrument embodying the present invention and showing the instrument in a normal writing condition with a portion of the writing lead extending forwardly of the instrument.
Figure 4:
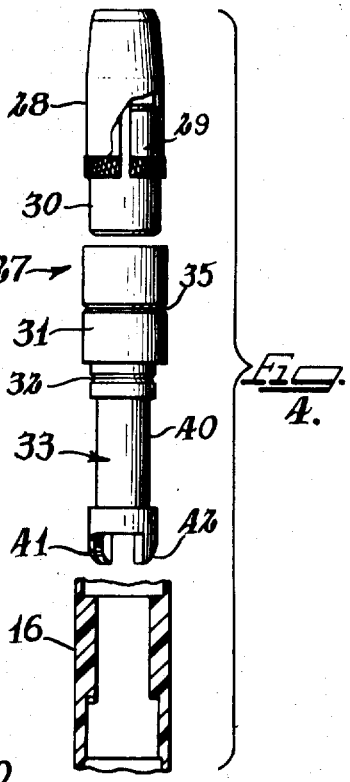
FIGURE 4 is a fragmentary, exploded view, partly in section and somewhat reduced in scale, showing the rearwardly disposed operating portions of the instrument shown in FIG. 1 and viewed perpendicularly to the section plane of FIG. 1.
Figure 5:
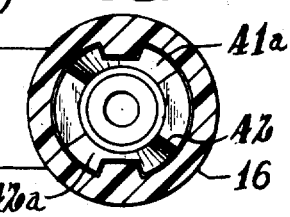
FIGURE 5 is a sectional view looking rearwardly and taken along the line 5—5 of FIG. 1, assuming the entire mechanism to be shown therein.
Figure 6:
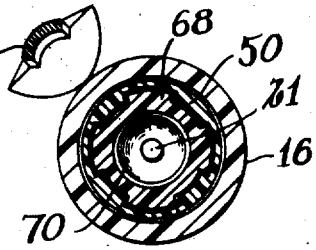
FIGURE 6 is a cross-sectional view taken along the line 6—6 of FIG. 1 and rotated through forty-five degrees, assuming the entire mechanism to be shown in FIG. 1.
Figure 2:
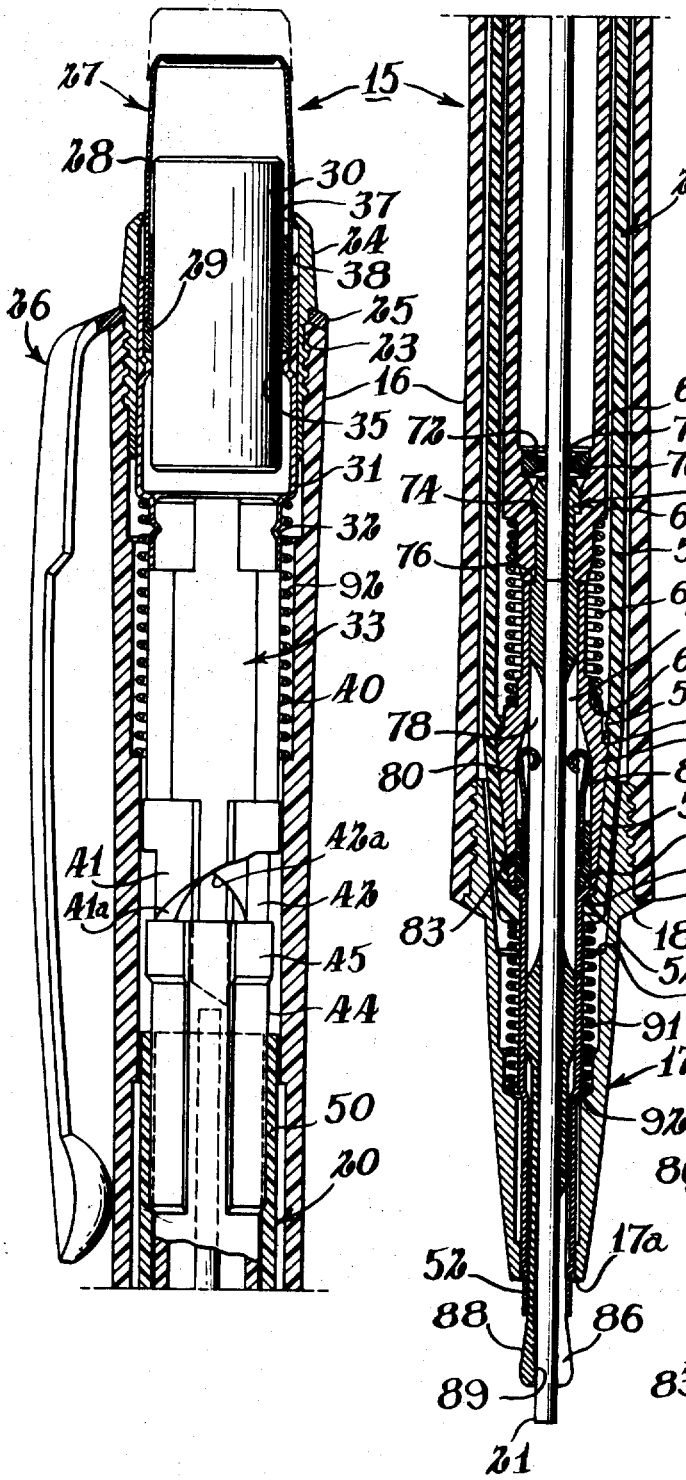
FIGURE 2 is a longitudinally sectioned view of the same instrument shown in FIGURE 1 but with the lead advancing mechanism in a non-writing fully depressed condition.

Referring now to the drawings, and more particularly to FIGS. 1 and 2 thereof, there is shown a mechanical pencil 15 which includes a barrel 16 formed of any suitable material such, for example, as a plastic. The barrel 16 is a generally cylindrical tubular member having an internally threaded forward end portion for receiving a tubular barrel point member 17. The point member 17 is preferably formed of metal and includes a relatively narrow annular flange 18 which fits in a complementary counterbore 19 at the forward end of the barrel 16. The barrel point 17 has a generally tapered external configuration to facilitate holding of the pencil in the fingers during writing.

As shown, a replaceable, throw-away type of lead cartridge and feed unit 20 is carried in the barrel parts 16 and 17 with the forward portion of the unit 20 extending through and beyond the front end 17a of the barrel point member 17. A supply of cylindrical writing lead rods 21 are held by the cartridge 20 and one of the lead rods is carried by the central portion of the cartridge and is adapted to protrude beyond the nose of the cartridge thereby to provide a writing nib. As the present description proceeds, it will be apparent that another lead rod follows the foremost rod through the feed mechanism so that as each rod 21 becomes exhausted, another rod is already in position for use.

The rear or upper end of the barrel 16 is provided with an internal thread 23 which mates with a complementary external thread on a tubular trim member or sleeve 24. The trim member 24 and the upper end of the barrel 16 cooperate to provide an annular groove in which an integral, ring-shaped portion 25 of a pocket clip 26 is fixedly supported when the trim member 24 is tightly threaded into the barrel 16.

An actuator assembly 27 is slidably fitted in the trim member 24 as shown. The assembly 27 includes a cup-shaped button member 28, preferably formed of metal, in which a split ferrule 29 is tightly supported. A cylindrical, resilient eraser 30, formed of rubber or other material, is press-fitted into the ferrule 29 with a part of the eraser extending fowardly therefrom. The entire assembly 27 may be pulled out of the rear end of the pencil in order to use the eraser 30. When in the pencil, however, depression of the assembly 27 actuates the lead advancing mechanism as more fully described hereinafter.

In order to removably hold the assembly 27 in the rear end of the pencil 15, a generally tubular eraser cup holder 31 is provided. The holder 31 is secured as by means of a staking 32 to a plunger member 33 which is preferably molded of a suitable plastic. The upper or rearward end of the cup holder 31 is tubular and has an internal diameter that slidably grips the cup 28 when the assembly 27 is fully inserted into the holder 31 with the lower marginal edge of the ferrule 29 in engagement with an internally extending annular shoulder 35 provided on the holder 31. Preferably, the shoulder 35 is formed by crimping the cup-holder 31 at the desired location.

As shown in FIGS. 1 and 2, the barrel trim member 24 includes a rear end opening 37 through which the button 28 slidably extends and which has a diameter less than the external diameter of the holder 31. The bore 38 in the remainder of the trim member 24 is, however, slightly greater than the external diameter of the cup 31 whereby the cup is free to reciprocate in the barrel although it cannot be removed through the opening 37. The plunger 33 includes a cylindrical body portion 40 terminating at its lower end in a pair of integrally molded camming fingers 41 and 42. The fingers 41 and 42 are spaced apart by one hundred and eighty annular degrees and have respective lower camming faces 41a and 42a which are generally curved in a concave direction and which are adapted to abuttingly engage the rearmost end 44 of a lead chamber member 68 of the lead cartridge unit 20, and to engage complemental cam surfaces of alternative forms of writing units for the casing of the pencil 15, as hereinafter explained.

The forward or leading edges 41a and 42a of the fingers 41 and 42 abut against the rearward face of the end 44 which is slidably fitted in a tubular cartridge shell 50. The end 44 has enlarged rearward portion 45 which provides an enlarged surface for engagement by the leading edges of the cam surfaces 41a and 42a.

The forward end of the shell 50 is gently tapered near the forward end 50a and is provided with an inner annular shoulder against which abuts the rear portion of a point sleeve 52 having a rearwardly disposed external annular flange 53. A generally tubular, elongated clutch seat member 55 has a forwardly extending nose portion which has an external surface complementary to the internal surface of the tapered portion 50a of the sleeve 50 and which is fixed between the sleeve portion 50a and a tubular bushing 57. An internally disposed annular shoulder 58 on the shell 50 abuts against a rearwardly facing seat 60 on the exterior of the clutch seat 55 so that the point sleeve 52, the bushing 57, the clutch seat 55 and the shell 50 are thus formed into a fixed unitary assembly.

The clutch seat member 55 includes a rearwardly facing annular shoulder against which abuts the forward end of a coil spring 65 which abuts at its rear end against a forwardly facing annular shoulder 67 on a tubular lead magazine member 68 sealed at its rear end by a disc 69. The lead chamber member 68 is slidably mounted and guided for longitudinal reciprocal movement within the shell 50, and both the shell 50 and the lead chamber member 68 are preferably formed of a translucent plastic material so that the lead rods contained therein are visible when the cartridge is removed from the housing.

In order to feed the lead rods 21 from the chamber 68 into the lead advancing mechanism, there is provided a lead rod guide washer 70 press-fitted into the forward end of the lead chamber. The washer 70 includes a centrally disposed annular bore 71 which is slightly larger in diameter than the lead rods 21 which are to be used with the pencil, whereby such lead rods may pass freely therethrough. Also, the upper surface 72 of the lead guide member 70 is tapered inwardly and downwardly toward the bore 71 so that the lead rods contained in the lead chamber will slide down along the surface 72 and fall one by one into the hole 71 as the lead rods move downwardly through the feed mechanism. It will be noted that the entire forward wall of the chamber 68 tapers downwardly toward the hole 71.

Forwardly of the guide washer 70 the rear end of a tubular point clutch member 73 is secured within the lead chamber 68. The point clutch member 73 is part of the lead advancing mechanism and functions to guide the lead during the advancing operation and to retain the lead in the advanced position during writing. As shown, the point clutch member 73 has an enlarged rearward end providing a forwardly facing annular shoulder which abuts against a rearwardly facing annular shoulder 74 formed on the internal surface of the lead chamber member 68. The point clutch 73 has a rearwardly facing, externally disposed annular shoulder 76 which tightly abuts the forward end of the lead chamber member 68 whereby the point clutch 73 and the lead chamber member 68 form a unitary assembly in which independent relative movement is prevented.

Figure 8:
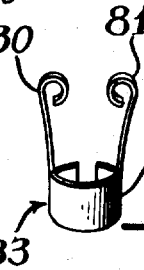
FIGURE 8 is a perspective view of the clutch member shown in FIGS. 1, 2, and 3.

The point clutch member 73 is generally tubular and has an internal diameter exceeding by a substantial amount the external diameter of the lead rods 21 so that the rods may pass freely therethrough. A pair of diametrically opposed slots 78 and 79 extend longitudinally through the central portion of the point clutch 73 so that a pair of diametrically opposed resilient fingers 80 and 81 on an actuating clutch 83 best shown in FIG. 8, may extend therethrough into engagement with the lead rod contained therein.

The actuating clutch 83 becomes operative during a lead advancing operation, and, after the point clutch member 73 and the lead 21 therein have been moved to a forwardmost position by depression of the assembly 27, serves to hold the lead in an advanced position while the point clutch member 73 moves rearwardly from the forward position shown in FIG. 2 to the position shown in FIG. 1. As shown, the clutch 83 includes a slit, ring-like lower portion 84 which surrounds the point clutch member 73 and frictionally but slidably rides on the point clutch member 73 for movement therewith between a forward position where the lower portion 84 abuts a shoulder in a clutch bushing 57 and a rear position where the fingers 80 and 81 are forced in against the lead 21 by the conical inner surface of the sleeve 55. The fingers 80 and 81 have reversely bent marginal end portions providing arcuate lead engaging surfaces.

In order to grip the lead rod 21 disposed in the point clutch member 73 to hold it in an advanced position during writing, the forward end of the point clutch member 73 is split by a plurality of longitudinal slots 86, preferably three in number, and the forward end of the point clutch member includes an enlarged, conical external surface 88 so that as the point clutch member 73 is moved rearwardly into the sleeve 52 the forward finger portions are compressed tightly against the lead rod. The inner surfaces 89 near the forward end of the point clutch members 73 are serrated to provide a better gripping surface for firmly engaging the lead rod 21. It will be understood that the forward end of the point clutch member 73, when in an unstressed condition, has an internal diameter that slidably engages the lead rods 21 sufficiently to prevent the lead rods from sliding out of the member 73. When the point clutch member 73 is fully retracted into the sleeve 52 as shown in FIG. 1, however, the clutch fingers formed by the slots 86 are compressed tightly by the sleeve 52 against the lead rod 21 to prevent the lead rods from sliding rearwardly.

As discussed above, reciprocation of the actuator assembly 27 is used to advance the lead rods in the cartridge 20. In order to bias the pencil cartridge 20 rearwardly against the actuator plunger 33, a coil spring 92 is compressed between an annular, rearwardly facing shoulder near the longitudinal center of the point member 17 and the forward end of the cartridge shell 50. When the actuator assembly 27 at the rear end of the pencil is depressed, the lead chamber 68 and the point clutch 73 are moved forwardly against the resilient coil spring 65 to feed a lead rod 21 through the point member 17 and out of the forward end thereof.

Figure 3:
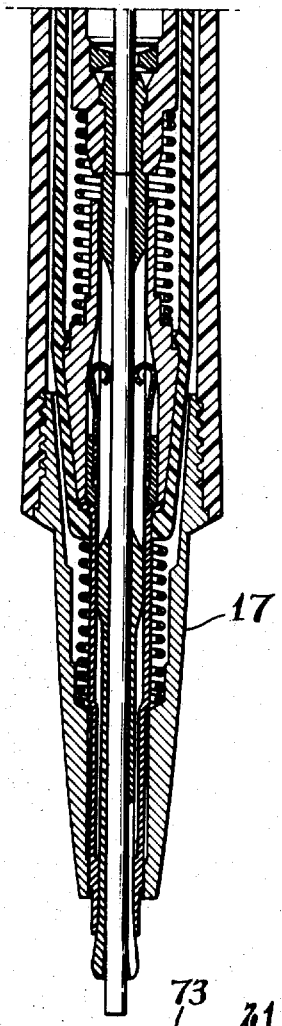
FIGURE 3 is a frangmentary, longitudinally sectioned view of the forward end of the instrument of FIGS. 1 and 2 showing the lead advancing mechanism in a non-writing condition intermediate the return movement of that mechanism from a full depressed condition to a normal writing condition.
Figure 7:
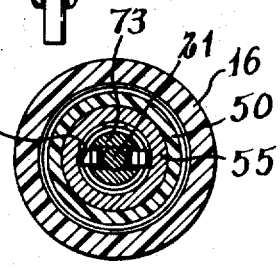
FIGURE 7 is a cross-sectional view taken along the line 7—7 of FIG. 1 assuming the entire mechanism to be shown therein.

A release of the actuator assembly 27 permits the springs 65 in the cartridge 20 to expand and to move the lead chamber 68 rearwardly in the sleeve 50. Inasmuch as the point clutch 73 is fixed to the chamber 68, it also moves rearwardly in the sleeve 50, and since the point clutch 73 frictionally carries the actuating clutch 83, the point clutch pushes the actuating clutch 83 rearwardly such that the fingers 80 and 81 are urged inwardly by the conical inner surface of the clutch seat 55 against the lead rod 21 as shown in FIG. 3. As the point clutch 73 continues its rearward movement, the actuating clutch 83 is restrained against further rearward movement by the clutch sleeve 55, so that the fingers 80 and 81 hold the lead rod 21 against further rearward movement. When the point clutch 73 is at the end of its rearward travel, the fingers 88 are further urged by the point sleeve 52 against the lead rod 21 to firmly hold it in a projected position exposed for writing.

In order to retract the lead rod 21 into the point clutch 73 to prevent undesired marking while the instrument 15 is carried on the person of the user, the actuator assembly should be partially depressed to release the clutch fingers of the enlarged end 88 of the point clutch 73 from the point sleeve 52 and also to slide the actuating clutch 83 forward in the sleeve 55 to permit the fingers 80 and 81 to expand out of engagement with the lead rod 21. With the actuator assembly 27 thus partially depressed, the lead rod 21 may be pushed into the point clutch 73 by a slight, externally applied force. When the actuator assembly 27 is thereafter released, the lead chamber 68 and the point clutch 73 will retract with the lead rod 21 remaining within the point clutch 73 in a shrouded position.

While the present invention has been described in connection with particular embodiments thereof, it will be understood that many changes and modifications may be made by those skilled in the art without departing from the invention. Therefore, by the appended claims, it is intended to cover all such changes and modifications as come within the true spirit and scope of the invention.

I claim:

1. A writing instrument for use with lead rods comprising:

a tubular barrel having a forward portion and a rearward portion detachably interconnected, an actuator assembly slidably mounted in said rearward portion for manual reciprocation in said barrel and including a manually operable actuator extending outwardly from said barrel, a self-contained pencil cartridge disposed in said forward portion and removable as an assembled unit from said barrel when said forward and rearward portions thereof are separated, said cartridge including:

a tubular shell member, a reciprocable lead supply chamber having a permanently closed rearward end and permanently mounted on and at least partially contained in said shell member, a point sleeve secured to the front end of said shell member, and clutch means mounted in said point sleeve for operating independently of said barrel to control the feeding of lead rods from said chamber, and means in said barrel for positioning said lead supply chamber in operating engagement with said actuator assembly.

2. A writing instrument according to claim 1 wherein said cartridge includes a spring biasing said reciprocable lead supply chamber rearwardly in said barrel.

3. A writing instrument according to claim 2 wherein said actuator assembly includes:

a plurality of symmetrically arranged angularly spaced portions that extend forwardly; and said lead supply chamber includes an annular portion extending rearwardly from said cartridge into operative engagement with said spaced portions.

4. A writing instrument according to claim 1 wherein said cartridge, when removed as a unit from said barrel, is operative to feed lead rods from said cartridge to a writing position.

5. A mechanical pencil of the step-by-step lead-propulsion type, including:

a tubular barrel having a forward portion and a rearward portion detachably interconnected and having an axially reciprocable means at its rearward end, said reciprocable means including a manually operable actuator extending outwardly from said barrel, and a lead cartridge unit disposed in said forward portion and removable as an assembled unit from said barrel when said forward and rearward portions thereof are separated, said cartridge unit comprising:

a tubular shell member supported in said tubular barrel, a slidable lead chamber assembly permanently mounted on and at least partially contained in said shell member and disposed in operating engagement with the reciprocable means of the tubular barrel, said assembly comprising a lead chamber having a permanently closed rearward end and mounted in communication with a longitudinally slotted lead guide tube that terminates in a forwardmost first lead clutch means, a point sleeve secured to the front end of said shell member for receiving said first lead clutch means, a second lead clutch means comprising a body portion slidably disposed on said lead guide tube and a lead engaging member in register with the longitudinal slot in the lead guide tube, clutch actuating means on said tubular shell member for moving the lead engaging member of the second lead clutch means into the longitudinal slot in the lead guide tube upon reciprocation of the lead chamber assembly within the shell member, means resiliently urging the lead chamber assembly rearwardly of the shell member, and means in said barrel for positioning said lead supply chamber in operating engagement with said reciprocable means.

6. A mechanical pencil according to claim 5, wherein said first lead clutch includes a plurality of radially-resilient lead-engaging fingers, said second lead clutch comprising an arcuate body portion and a plurality of radially-resilient lead-engaging jaws.

7. The invention of claim 6 wherein the lead-engaging jaws of the second lead clutch comprise spring fingers that extend from the arcuate body portion and that terminate in radially resilient rounded ends.

8. The invention of claim 6 wherein the tubular shell member and the lead chamber are transparent.

9. A lead cartridge *writing* unit [for a mechanical pencil] of the step-by-step lead-propulsion type, [that includes a forwardly opening tubular barrel member having a forward portion and a rearward portion detachably interconnected and an axially reciprocable means at its rearward end, said means including a manually operable actuator extending outwardly from said barrel, said lead cartridge unit] comprising:

a tubular shell member [removably supported in the tubular barrel], a slidable lead chamber assembly permanently mounted on and at least partially contained in said shell member and having a rearwardly-disposed abutment for [operating engagement with the reciprocable means of the pencil,] *reciprocating said assembly in said shell member,* said assembly comprising a lead chamber having a permanently closed rearward end and mounted in communication with a laterally perforate lead guide tube that terminates in a forwardmost first lead clutch means, a point sleeve [secured to] *disposed at* the front end of said shell member for receiving said lead guide tube, a second lead clutch means slidably carried on said lead guide tube and comprising a body portion and a lead-engaging member, clutch actuating means [on] *carried by* said tubular shell member for moving the lead-engaging member transversely through the perforate lead guide tube upon rearward movement of the lead chamber assembly within said shell member, *and* means resiliently urging said lead chamber assembly rearwardly of said shell member[, and]

[means in said barrel for positioning said lead supply chamber in operating engagement with said reciprocable means, whereby said cartridge unit can be removed as an assembled unit from said barrel when said forward and rearward portion thereof are separated].

*10. A disposable lead cartridge type writing unit of the step-by-step lead-propulsion type, comprising*

*a tubular shell member,*

*a lead chamber assembly permanently and reciprocably mounted in said shell member and having a permanently closed lead chamber therein, a forwardmost first lead clutch means, and lead guide tube means interconnecting said lead chamber and said clutch means for carrying lead from said chamber to said clutch means,*

*a point sleeve mounted within said shell member at the forward end thereof for cooperative engagement with said clutch means to move said clutch means into a lead gripping position when said lead chamber assembly moves rearwardly in said shell member,*

*a tubular clutch actuating member mounted in said barrel member and having a convergent, generally conical inner surface near its rearward end,*

*second clutch means frictionally and slidably carried on said lead guide tube means within said clutch seat and comprising a sleevelike body portion and a plurality of lead engaging fingers adapted to pass through perforations in the wall of said lead guide tube means upon rearward movement of said fingers into engagement with said conical surface of said clutch actuator member,*

*said clutch actuating member having a forwardly facing seat engaging a rearwardly facing seat on the inner surface of said shell member, and further having a rearwardly facing annular seat, and*

*a spring interposed between said annular seat and said lead chamber assembly for urging said lead chamber assembly in a rearward direction in said shell member,*

*whereby forward movement of said lead chamber assembly in said shell releases both of said clutch means, and rearward movement of said lead chamber assembly in said shell causes said second clutch means first to move into a lead gripping position and thereafter to cause said first clutch means to move into lead gripping position upon a further predetermined rearward movement of said lead chamber assembly in said shell member relative to said second clutch means.*

References Cited

The following references, cited by the Examiner, are of record in the patened file of this patent or the original patent.

UNITED STATES PATENTS

| | | | |
|---|---|---|---|
| 1,447,678 | 3/1923 | Lindberg | 401—67 |
| 2,528,328 | 10/1950 | Baker et al. | 401—67 |
| 3,137,276 | 6/1964 | Weisser | 401—111 |

FOREIGN PATENTS

| | | | |
|---|---|---|---|
| 527,755 | 10/1940 | Great Britain | 401—67 |
| 696,120 | 9/1940 | Germany | 401—67 |
| 414,705 | 8/1946 | Italy | 401—67 |

LAWRENCE CHARLES, Primary Examiner